US012696209B2

(12) United States Patent
Mohammed

(10) Patent No.: US 12,696,209 B2
(45) Date of Patent: Jul. 28, 2026

(54) METHODS AND DEVICES OF PROCESSING WIRELESS SIGNALS WITH ADAPTIVE FREQUENCY SHIFT CORRECTION

(71) Applicant: Morse Micro Pty. Ltd., Surry Hills (AU)

(72) Inventor: Mohammed Mohammed, Surry Hills (AU)

(73) Assignee: Morse Micro Pty. Ltd., Surry Hills (AU)

( * ) Notice: Subject to any disclaimer, the term of this patent is extended or adjusted under 35 U.S.C. 154(b) by 540 days.

(21) Appl. No.: 18/465,829

(22) Filed: Sep. 12, 2023

(65) Prior Publication Data

US 2024/0214958 A1 Jun. 27, 2024

(30) Foreign Application Priority Data

Dec. 23, 2022 (AU) ................................. 2022903996

(51) Int. Cl.
*H04W 56/00* (2009.01)
*H04L 7/033* (2006.01)
(52) U.S. Cl.
CPC ......... *H04W 56/0035* (2013.01); *H04L 7/033* (2013.01)

(58) Field of Classification Search
CPC . H04L 7/033; H04L 27/2602; H04L 27/2675; H04W 56/0035; H04J 3/0617
USPC .......................................................... 375/376
See application file for complete search history.

(56) References Cited

U.S. PATENT DOCUMENTS

2015/0110231 A1* 4/2015 Alexander .......... H04L 27/2675
375/362

* cited by examiner

*Primary Examiner* — Leila Malek
(74) *Attorney, Agent, or Firm* — Polsinelli PC

(57) ABSTRACT

Methods and wireless communication devices for processing wireless signals with adaptive frequency shift correction. An embodiment of the method includes receiving a wireless signal by the receiver, performing packet detection to detect at least a portion of a preamble part of a current frame carried in the wireless signal according to a default frequency output from a Phase Lock Loop (PLL), estimating a frequency offset between the default frequency and a frequency used to carry information in the preamble part of the current frame, reconfiguring the PLL according to the frequency offset to output a compensated frequency, and processing a packet part of the current frame using the compensated frequency output from the PLL. The method may further mitigate the impact of a residual Direct current (DC) component by filtering the wireless signal based on the compensated frequency.

20 Claims, 8 Drawing Sheets

800

METHODS AND DEVICES OF PROCESSING WIRELESS SIGNALS WITH ADAPTIVE FREQUENCY SHIFT CORRECTION

The present application claims priority from Australian provisional patent application number 2022903996 filed on 23 Dec. 2022, the contents of which are incorporated herein by cross-reference.

FIELD OF THE INVENTION

The present disclosure generally relates to wireless communications. Specifically, aspects of the present disclosure are related to receiving wireless signals with adaptive frequency shift correction.

BACKGROUND

A wireless network, for example a Wireless Local Area Network (WLAN) such as a Wi-Fi (based on at least one of the Institute of Electrical and Electronics Engineers (IEEE) 802.11 standards) network, includes one or more Access Points (APs) that communicate with one or more Stations (STAs). The APs serve the STAs by a shared wireless communication medium over a specific frequency band. For example, the IEEE 802.11ah standard, also referred to as Wi-Fi Halow, uses sub-1 GHz license-exempt frequency bands to provide extended range Wi-Fi networks. IEEE 802.11ah also benefits from lower energy consumption, allowing the creation of large groups of stations or sensors that cooperate to share signals, and supporting the concept of the Internet of Things (IoT). The license-exempt frequency band below 1 GHz for Wi-Fi Halow, excluding the TV white spaces, varies from country to country.

A Direct Current (DC) offset in a received wireless signal is an undesirable impairment in receivers. The DC offset in the received wireless signal is typically caused by the leakage of a Local Oscillator (LO) energy at a mixer stage and through the Power Amplifier (PA) into the receiver. The mixer of a direct conversion receiver translates the modulation around a Radio Frequency (RF) carrier to a zero Intermediate Frequency (IF) based on an LO output signal with a fixed amplitude sinusoid, where the LO frequency is set to equal to the RF frequency. Any LO energy leakage in the RF path will self-mix and produce a DC offset. This LO energy leakage is inevitable in System on Chip (SoC) solutions as it is difficult to achieve perfect isolation between components that sit on the same substrate. The receiver performance can be degraded due to the DC offset. The DC offset can limit the dynamic range of the front-end receiver, especially the Analog to Digital Converter (ADC). This is more critical in Wi-Fi systems employing Orthogonal Frequency Division Modulation (OFDM) for modulation which has a high Peak to Average Power Ratio (PAPR). The system can maximize the utilization of the front-end dynamic range including the power amplifiers and the ADC when the received signal is centered around zero DC. In a conventional receiver, the DC offset can be reduced by calibrating the radio front-end, however, this radio front-end calibration is usually insufficient to completely remove the DC offset. In practice, there will be a remaining DC offset left in the system after calibration, and this remaining DC offset is called a residual DC component. A High Pass Filter (HPF) is typically employed to filter the received wireless signal to remove the residual DC component.

The residual DC component impact on the performance of a Wi-Fi OFDM system becomes more severe if there is a frequency offset in either ends of the system, and the DC impact becomes more noticeable as the magnitude of the frequency offset increases. The frequency offset results from a drift in the crystal oscillator clock frequency in the transmitter side and/or the receiver side. For example, at a high/low temperature, the Phase Lock Loop (PLL) frequency change introduces a frequency offset of up to + or −20 parts per million (ppm). The quality of the received Wi-Fi signal degrades if this frequency offset is not corrected in time. The performance degrades significantly especially when the Wi-Fi signal is modulated using a high Modulation Coding Scheme (MCS). In low modulation coding schemes where more redundancy codes are used for error correction or employing modulation types that are less susceptible to noise, the performance is less impacted by the frequency offset, however, in high modulation coding schemes that have low coding redundancy rates or employing modulation types that are more susceptible to noise, the performance degradation due to the frequency drift is much severe.

A frequency offset can be corrected by digitally estimating a phase drift that results from the frequency offset, and then compensating the phase drift on digital time domain samples. The effect of having a frequency offset on a received signal is like shifting the entire spectrum of the received signal in a frequency domain according to the frequency offset. This frequency shift moves the received signal away from the pre-configured LO frequency, which means that the residual DC component of the signal is not residing on the zero frequency. The residual DC component is now located at a frequency, F_offset, which is equal to the frequency offset of the system. This is a problem because the residual DC component is now a tone or a narrow band interference that is located within the desired frequency bandwidth.

The sub-carriers of an IEEE 802.11ah system are very close to each other, where the spacing between sub-carriers in the IEEE 802.11ah system is one-tenth of that of a legacy Wi-Fi system (e.g. 802.11ac). This makes the IEEE 802.11ah system more vulnerable to Inter-Carrier Interference (ICI) due to frequency offsets as even a minor frequency drift can cause interference between sub-carriers. If a DC tone, due to frequency shift, falls exactly on a sub-carrier frequency, then it will only impact that particular sub-carrier, however, if the DC tone falls anywhere between sub-carriers, its impact will extend to influence more sub-carriers, which is usually the case in real systems.

SUMMARY

The following summary presents technical features relating to one or more aspects disclosed herein and should not be considered as an extensive overview relating to all contemplated aspects, nor should the following summary be considered to identify key or critical elements relating to all contemplated aspects or to delineate the scope associated with any aspect. Accordingly, the following summary has the sole purpose to present certain concepts relating to one or more aspects relating to the algorithms disclosed herein in a simplified form to precede the detailed description presented below.

Disclosed are methods and wireless communication devices for processing wireless signals with adaptive frequency shift correction. According to at least one illustrative example, a method of adaptive frequency shift correction through Phase Lock Loop (PLL) frequency compensation is provided. Some embodiments of the method include receiving a current frame carried in a wireless signal by a receiver, performing packet detection to detect at least a portion of a preamble part of the current frame according to a default frequency output from a PLL, estimating a frequency offset between the default frequency and a frequency used to carry information in the preamble part of the current frame, reconfiguring the PLL according to the frequency offset to output a compensated frequency, and processing a packet part of the current frame using the compensated frequency output from the PLL. The portion of the preamble part includes a periodic structure for packet detection and frequency acquisition. An example of the default frequency output from a PLL is a default Local Oscillator (LO) frequency.

Some embodiments of packet detection include correlating samples of the wireless signal with one or more correlators based on the default frequency output from the PLL and detecting the portion of the preamble part depending on power levels of correlation outputs. In some embodiments, the step of processing a packet part includes demodulating the packet part based on the compensated frequency output from the PLL after packet detection.

In an aspect of the method, the adaptive frequency shift correction is achieved by a packet based PLL frequency compensation method, which includes resetting the PLL to the default frequency after completely processing the current frame. The method further receives and performs packet detection on at least a portion of a preamble part of a subsequent frame according to the default frequency and reconfigures the PLL to output a new compensated frequency for processing a packet part of the subsequent frame. That is, the packet based PLL frequency compensation method can promptly corrects a frequency offset for each received frame by deriving a PLL compensated frequency from the frequency offset measured in one part of a received frame and processing another part of the received frame using the PLL compensated frequency.

In an aspect of the method, the step of estimating a frequency offset includes detecting a phase drift of the current frame in radians and converting the phase drift in radians to the frequency offset in Hertz. Some embodiments of reconfiguring the PLL to output the compensated frequency include increasing or decreasing the default frequency by the frequency offset. The PLL is reconfigured to output the compensated frequency during processing the preamble part of the current frame before processing the packet part of the current frame.

In some embodiments, the method further includes applying a High Pass Filter (HPF) to filter the wireless signal carrying the current frame to remove a residual DC component of the wireless signal after reconfiguring the PLL to output the compensated frequency.

In some embodiments of the present invention, the current frame is a Wi-Fi frame, and the portion of the preamble part is a Short Training Field (STF). The preamble part further includes a Long Training Field (LTF). The STF of the current frame is detected using the default frequency output from the PLL according to some embodiments. In an aspect of the present invention, the method further includes performing Automatic Gain Control (AGC) before performing packet detection on the STF and LTF of the current frame, determining a settling time of reconfiguring the PLL according to the frequency offset, and performing packet detection on the LTF according to the compensated frequency output from the PLL after the settling time. The settling time is a time required for reacting PLL compensation from a radio domain to a digital domain. For example, the settling time is determined based on a filter delay time. In some embodiments of the present invention when AGC is applied for receiving the wireless signal, the LTF packet detection is delayed by a predetermine period to prevent packet detection on the LTF of the current frame before the settling time.

In an aspect of the present invention, a wireless communication device for processing wireless signals with adaptive frequency shift correction is provided. The wireless communication device includes a receiver having a PLL, a processor communicatively coupled with the receiver, and one or more memory banks communicatively coupled to the processor and storing process readable codes. The wireless communication device is configured for receiving a current frame carried in a wireless signal by the receiver, performing packet detection on at least a portion of a preamble part of the current frame according to a default frequency output from the PLL, estimating a frequency offset between the default frequency and a frequency used to carry information in the preamble part of the current frame, reconfiguring the PLL according to the frequency offset to output a compensated frequency, and processing a packet part of the current frame using the compensated frequency output from the PLL. The portion of the preamble part includes a periodic structure for packet detection and frequency acquisition, for example, the portion of the preamble part is a training field such as an STF.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following drawing figures.

DETAILED DESCRIPTION

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive. The following description of the embodiments will provide those skilled in the art with an enabling description for implementing an example aspect. It should be understood that changes may be made in the function and arrangement of elements without departing from the spirit and scope of the application as set forth in the claims.

Figure 1A:
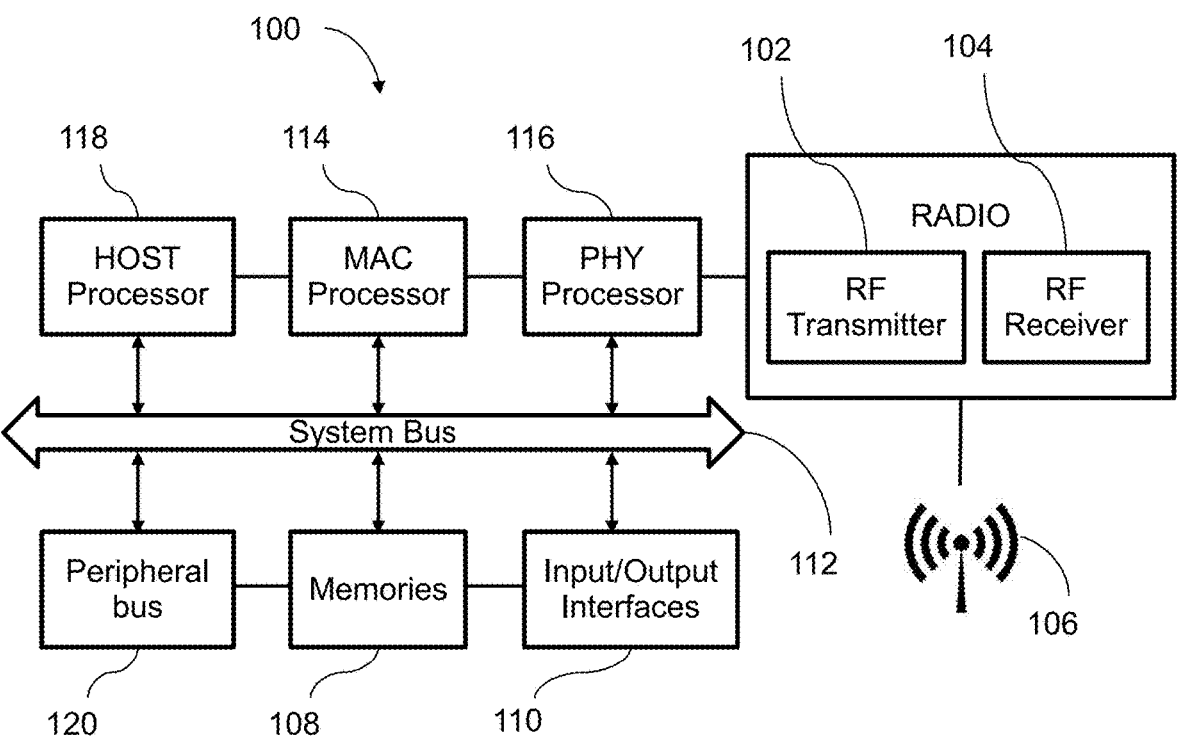
FIG. 1A is an exemplary high-level block diagram of a wireless communication device that can be a station (STA) or Access Point (AP) complying with one or more IEEE 802.11 (Wi-Fi) standards.

FIG. 1A illustrates a high-level block diagram of a wireless communication device 100 that can be implemented in an STA or an AP used to perform an embodiment of the adaptive frequency shift correction method. The wireless communication device 100 manages a Medium Access Control (MAC) layer and a Physical (PHY) layer complying with one or more IEEE 802.11 standards. In some examples, the wireless communication device is equipped in a mobile device, a wearable device, an extended reality device (e.g., a Virtual Reality (VR) device, an Augmented Reality (AR) device, or a Mixed Reality (MR) device), a personal computer, a laptop computer, a video server, a vehicle, an Internet of Thing (IoT) device, or other devices.

The wireless communication device 100 includes a Radio Frequency (RF) transmitter module 102, an RF receiver module 104, an antenna unit 106, one or more memory banks 108, input and output interfaces 110, and a system bus 112. The RF transmitter module 102 and the RF receiver module 104 are also known as a modem (modulator-demodulator), which transmits data by modulating one or more carrier wave signals to encoded digital information, as well as receives data by demodulating the signal to recreate the original digital information. As illustrated, the wireless communication device 100 further includes a MAC processor 114, a PHY processor 116, and a HOST processor 118. These processors can be any type of Integrated Circuit (IC) including a general processing unit, an Application Specific Integrated Circuit (ASIC) or Reduced Instruction Set Computer-five (RISC-V) based ICs, amongst others.

Memory banks 108 store software and/or computer-readable instructions, including software (and/or computer-readable instructions) that can be used to implement at least some functions of the MAC layer. Memory bank 108 can include multiple different types of memory with different performance characteristics. Each processor included in the wireless communication device 100 (e.g., MAC processor 114, PHY processor 116, or HOST processor 118) executes respective software to implement the functions of the respective communication/application layer. Each processor can include a general-purpose processor and a hardware or software services configured to control the processor or a special-purpose processor where software instructions are incorporated into the processor design.

The PHY processor 116 includes a transmitting signal processing unit and a receiving signal processing unit (not shown) and is used to manage the interface with the Wireless Medium (WM). The PHY processor 116 operates on Physical layer Protocol Data Units (PPDUs) by exchanging digital samples with the radio module which includes the RF transmitter 102, the RF receiver 104, Analog-to-Digital Converters (ADCs), and digital filters. The MAC processor 114 executes MAC level instructions and manages the interface between the STA application software and the WM, through the PHY processor 116. The MAC processor 114 is responsible for coordinating access to the WM so that the AP and STAs in range can communicate effectively. The MAC processor 114 adds header and tail bytes to units of data provided by the higher levels in the STA and sends them to the PHY layer for transmission. The reverse happens when receiving data from the PHY layer. If a frame is received in error, the MAC processor 114 manages the retransmission of the frame. The HOST processor 118 interfaces with the MAC layer and is responsible for running higher level functionalities of the wireless communication device 100.

The peripheral bus 120 connects to several peripherals that support core functions of the wireless communication device 100, including timers, interrupts, radio/filters/system registers, counters, Universal Asynchronous Receiver Transmitter (UART), General Purpose Input/Output (GPIO) interfaces, among others. The memory bank 108 may further store an operating system and applications. In some embodiments, the memory stores recorded information about captured frames and packets. The input/output interfaces 110 allow for exchange of information with a user of the wireless communication device 100. The antenna unit 106 includes a single antenna and/or multiple antennas that can be used to implement Multiple Input Multiple Output (MIMO) techniques.

Figure 1B:
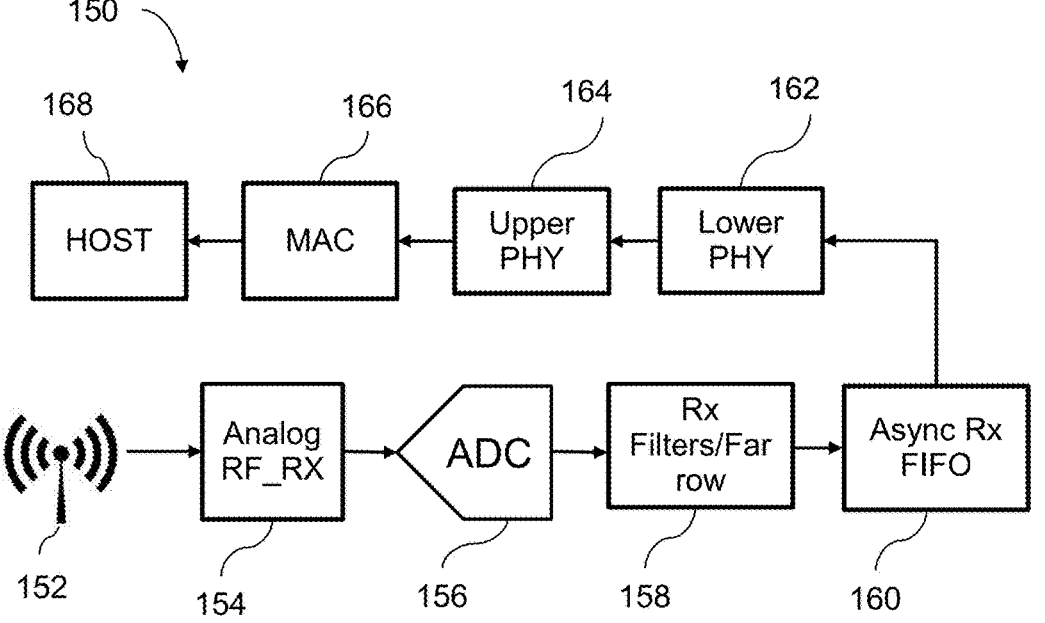
FIG. 1B is a schematic block diagram of a receiver data flow architecture in the wireless communication device of FIG. 1A for receiving wireless signals over a wireless medium.

FIG. 1B illustrates a schematic block diagram of a receiver data flow architecture 150 that can be used to receive wireless signals carrying frames over the WM. In one illustrative embodiment, the receiver data flow architecture 150 illustrated in FIG. 1B corresponds to or otherwise be associated with the wireless communication device 100 illustrated in FIG. 1A. In some embodiments, wireless signals are received over the WM and transformed into electrical RF signals by a receiving antenna 152. A Radio Frequency (RF) receiver front-end 154 receives an electrical RF signal carrying Wi-Fi frames. The RF receiver front-end 154 may contain a Low Noise Amplifier (LNA), a mixer for down converting the RF signal to an Intermediate Frequency (IF) or baseband signal based on a LO signal, and a Trans-Impedance Amplifier (TIA). An Analog-to-Digital Converter (ADC) 156 coupled to the RF receiver front-end 154 transforms the baseband signal from analog to digital. The output of the ADC 156 is connected to a receiver down-sampling chain 158 (Rx Filters/Farrow), samples are then collected in an asynchronous receiving First In First Out (FIFO) structure 160. These samples in the asynchronous receiving FIFO structure can be accessed by a packet detect module and a sub-band module, both of which may be included in a lower-level PHY module 162 can include hardware and implement algorithms that can be used to analyze initial selections of the PHY Protocol Data Unit (PPDU) in the time domain. Based on the analysis, the packet detect module recognizes a received 802.11 frame and synchronize the frequency and timing of the STA with the frame being received. The sub-band module included in the lower-level PHY module 162 includes hardware and/or implement algorithms that can be used to detect which subchannel in the allocated frequency band is being used by the AP for the packet being received.

Once a packet is detected and the relevant subchannel is established, samples are forwarded to an upper-level PHY module 164. The upper-level PHY module 164 together with the lower-level PHY module 162 are included in the PHY processor 116 illustrated in FIG. 1A. In some embodiments, the upper-level PHY module 164 can be used to process and decode Orthogonal Frequency Division Multiplexing (OFDM) symbols, with the support of a coprocessor module, to reconstruct a full PPDU. The reconstructed PPDU is output by the upper-level PHY module 164 and subsequently processed by a MAC layer processor 166. MAC layer processor 166 is used to extract the data payload from the PPDU and provide the relevant information to the HOST layer 168 for consumption.

Figure 2A:
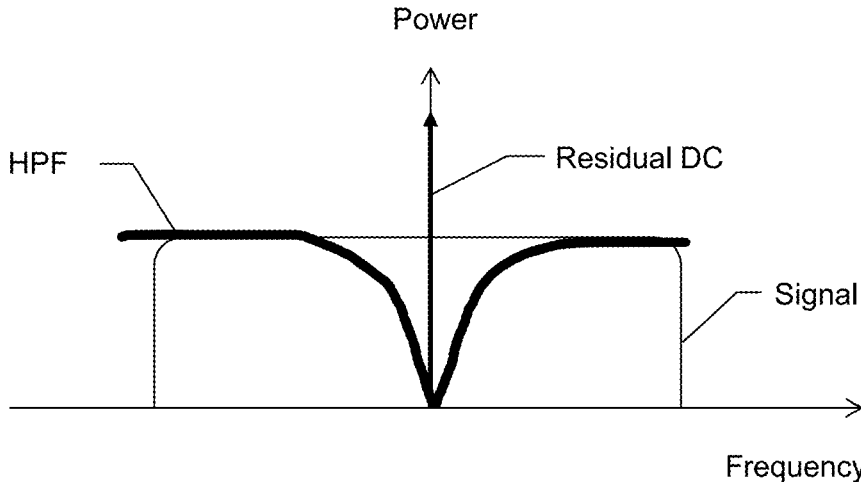
FIG. 2A is a power frequency plot showing power levels of an ideal wireless signal across a frequency band and corresponding power levels of this ideal wireless signal after applying a High Pass Filter (HPF) to remove the residual DC component.
Figure 2B:
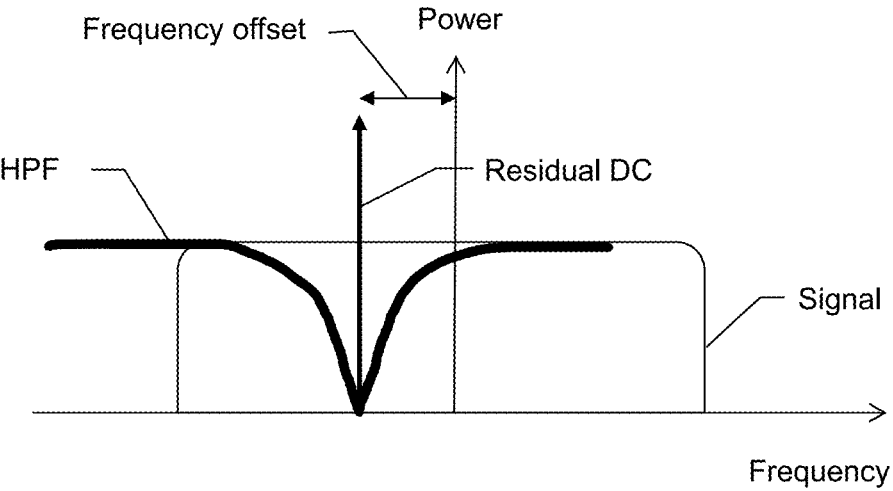
FIG. 2B is a power frequency plot showing power levels of a wireless signal affected by a frequency offset and corresponding power levels of this received wireless signal after applying an HPF.

As previously described, a DC offset in a wireless signal typically caused by the LO leakage is defined as a mean magnitude of the wireless signal in a time domain. A residual DC component remained after calibrating the DC offset is undesirable and can be suppressed by applying a High Pass Filter (HPF). FIG. 2A and FIG. 2B illustrate an example of applying a HPF aiming to filter a received wireless signal to remove a residual DC component of the received wireless signal. Ideally, the residual DC component and the center frequency of the received wireless signal are located at zero frequency after down converting from a RF frequency to a baseband frequency as shown in the power frequency plot of FIG. 2A. Due to a drift in the crystal oscillator clock frequency in the transmitter side and/or receiver side, the center frequency of the received wireless signal drifts from zero frequency by a frequency offset as shown in the example of FIG. 2B. The HPF is designed to remove the residual DC component located at zero frequency, however, using the HPF in cases of the center frequency drifts away from zero frequency as shown in FIG. 2B could result in filtering a portion of the desired signal.

Figure 3A:
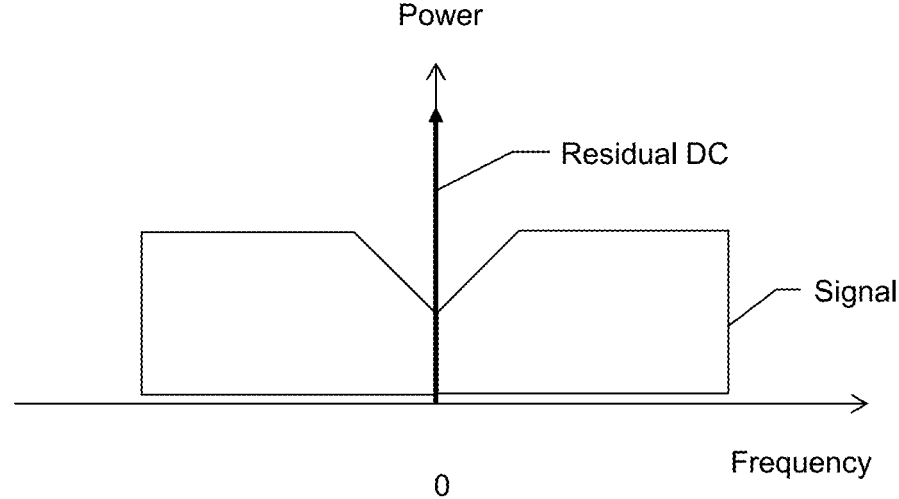
FIG. 3A is a power frequency plot showing power levels of a received wireless signal across a frequency band, where a residual DC component is located at a center frequency of the wireless signal.
Figure 3B:
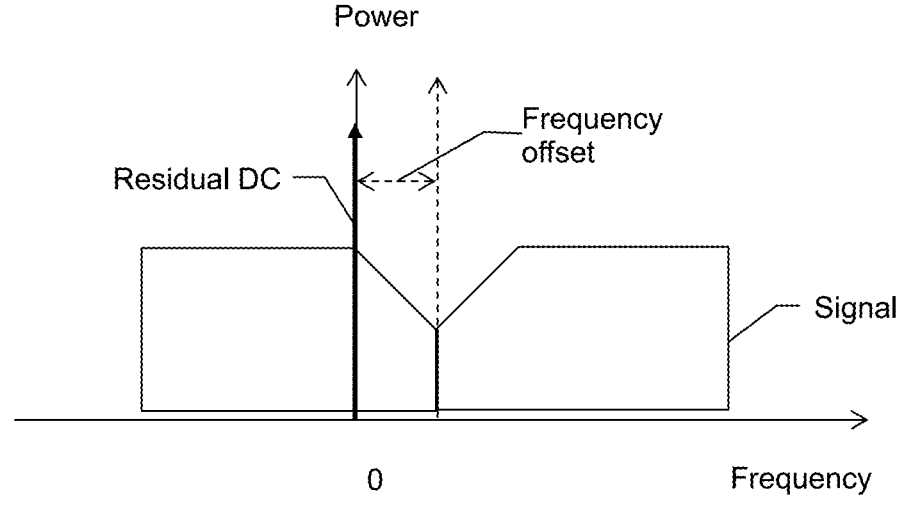
FIG. 3B is a power frequency plot showing power levels of the received wireless signal of FIG. 3A after applying digital phase correction, where the residual DC component is shifted away from the center frequency of the wireless signal.

Conventional receivers correct the frequency offset by estimating a digital phase drift of the received signal and compensating the digital phase drift on digital time domain samples. FIG. 3A and FIG. 3B demonstrate an example of applying digital phase correction to correct the frequency offset. In FIG. 3A, a residual DC component of a received wireless signal is located at a center frequency of the received wireless signal. The entire spectrum of this received wireless signal is shifted back to a pre-configured Local Oscillator (LO) frequency range in the frequency domain to compensate a frequency offset by applying digital phase correction as shown in FIG. 3B. The residual DC component of the received wireless signal appears like a narrow band interference after digital phase correction as shown in FIG. 3B. The residual DC component is now located within the desired frequency bandwidth and is difficult to suppress in the received wireless signal.

Figure 4A:
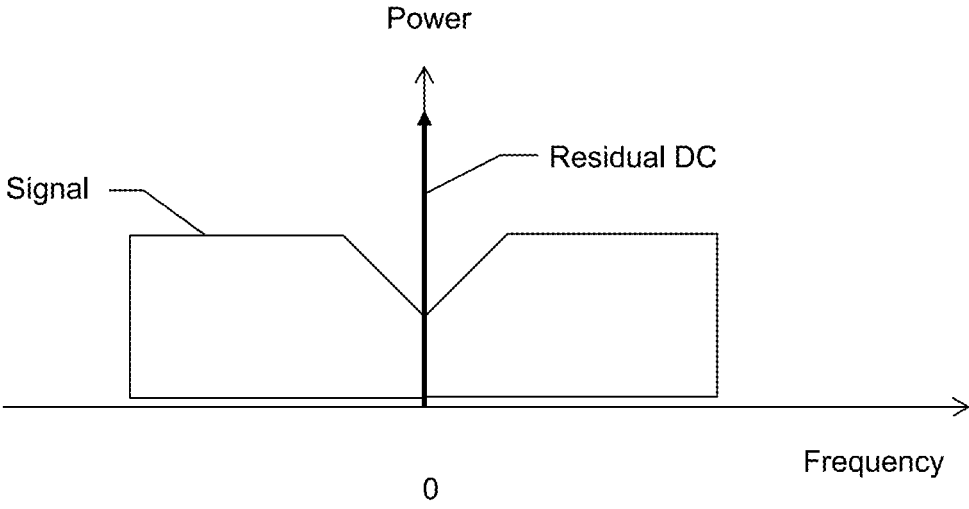
FIG. 4A is a power frequency plot showing power levels of a received wireless signal across a frequency band, where a residual DC component is located at a center frequency of the wireless signal.
Figure 4B:
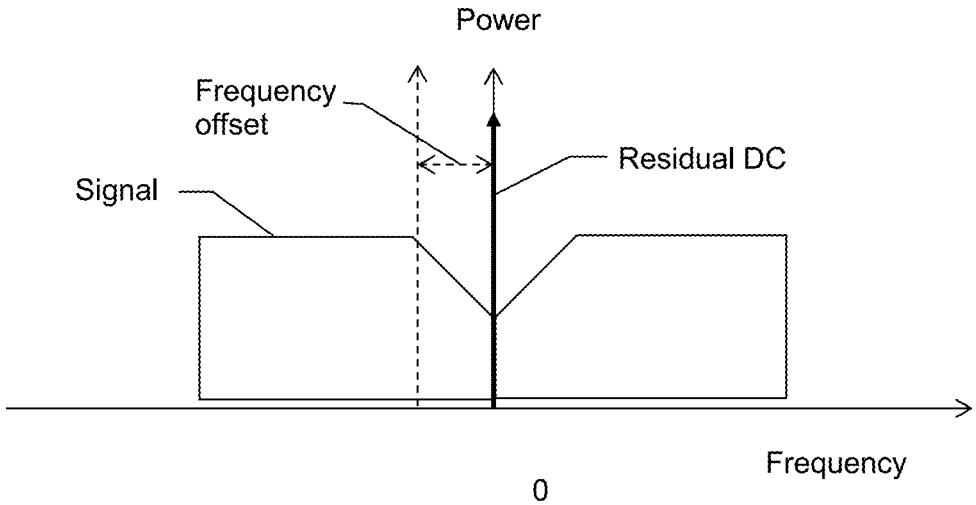
FIG. 4B is a power frequency plot showing power levels of the received wireless signal of FIG. 4A after applying PLL frequency compensation according to an embodiment of the present invention, where a residual DC component is still located at the center frequency of the wireless signal.

Instead of shifting the received wireless signal to compensate for the frequency offset by digital phase correction, embodiments of the adaptive frequency shift correction methods or devices shift a Local Oscillator (LO) frequency of a Phase Lock Loop (PLL) in the receiver. This ensures that the DC component remains on the DC frequency (i.e. zero frequency). FIGS. 4A and 4B illustrate the effect of before and after applying an embodiment of correcting a frequency offset in the received wireless signal by PLL frequency compensation. In this embodiment, PLL compensation is done by using a coarse angle that is estimated during receiving a Short Training Field (STF) in a received frame of the wireless signal to calculate the frequency offset. The PLL is reconfigured with a new compensated frequency according to the calculated frequency offset. In FIG. 4A, the center frequency of the received wireless signal affected by a frequency offset after down conversion to the baseband frequency is zero. As shown in FIG. 4B, the entire signal shifts according to a frequency offset estimated from the received wireless signal and the residual DC component of the received signal is still resided in the zero frequency after PLL compensation according to this embodiment. In this way, the residual DC component of the received signal can be easily removed by a high pass filter or band pass filter without losing some of the desired signal.

Figure 5:
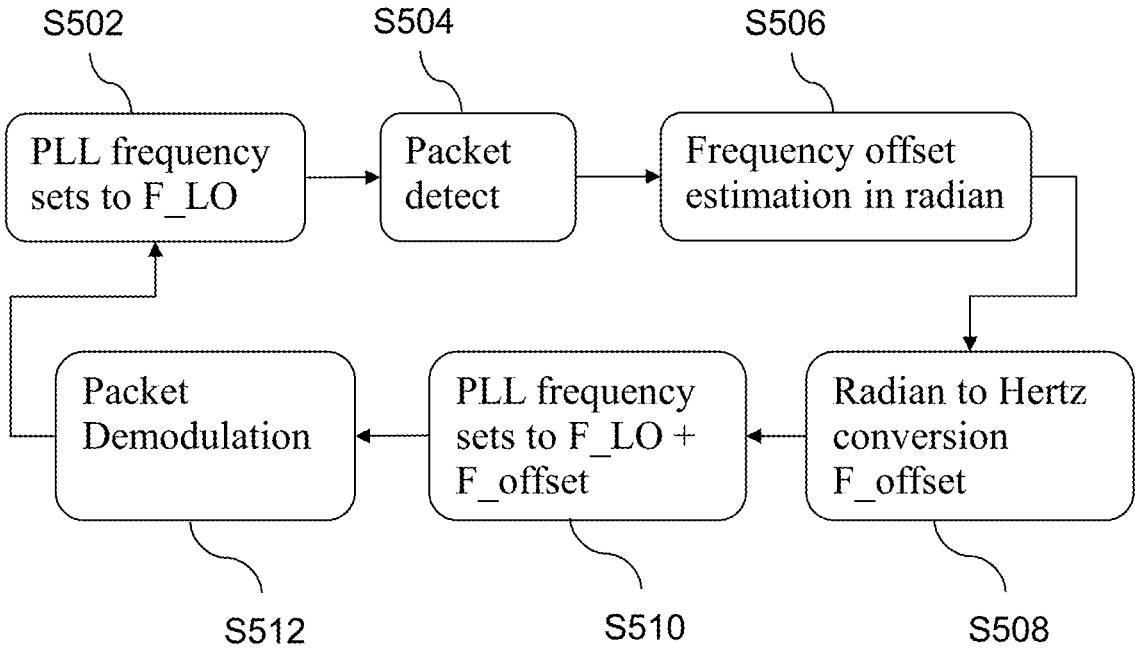
FIG. 5 is a simplified flowchart illustrating steps executed for processing each received frame according to an embodiment of the adaptive frequency shift correction method for improving the performance of receiving a wireless signal affected by a frequency offset.

Some embodiments of the adaptive frequency shift correction methods or devices perform PLL frequency compensation in every receiving frame. This method can be done on a per packet basis where a frequency offset is estimated for each packet and the estimated frequency offset is added to the PLL output frequency before completely processing the entire frame. This is feasible especially for communication systems employing wireless frames with a relatively long symbol duration. The receiver can reconfigure the PLL according to an estimated frequency offset for each receiving frame. Some other embodiments regularly or adaptively perform PLL frequency compensation at an interval or upon receiving every $N^{th}$ frame, where N is a configurable integer. FIG. 5 shows a simplified flowchart illustrating steps executed in an embodiment of the adaptive frequency shift correction method. Before the receiver detects a current frame in a wireless signal, the PLL of the receiver is configured to generate a default frequency (for example, a default LO frequency, F_LO) for packet detection in step S502. Once the wireless signal is received by the receiver, the receiver performs packet detection to detect at least a portion of a preamble part of the current frame in step S504. The portion of the preamble part consists of a periodic reference signal for frequency acquisition, for example, the portion of the preamble part is a Short Training Field (STF). For example, packet detection is performed by correlating the wireless signal with one or more correlators or kernels to generate an output. The portion of the preamble part is successfully detected by packet detection when peaks of the output spread out at predetermined intervals. A phase drift resulting from a frequency offset of the current frame can be estimated in radians in step S506. In step S508, the estimated phase drift is converted from radians to hertz to derive a frequency offset F_offset between the PLL output frequency and an actual frequency used to carry the preamble part of the current frame. This frequency offset F_offset corresponding to the current frame is quickly fed to the PLL to reconfigure the output frequency to be a sum of the default frequency and the frequency offset (F_LO+F_offset) in step S510. A packet part of the current frame is then received and demodulated according to this compensated frequency (F_LO+F_offset) of the PLL in step S512, and after the entire frame is demodulated, the receiver returns to the listen mode and the PLL is reconfigured once more to the default frequency (F_LO) for receiving a subsequent frame in step S502.

In some embodiment, the PLL is reconfigured to output a compensated frequency according to an estimated frequency offset of a received frame, and this compensated frequency is used to process the packet part of the received frame. The PLL of an embodiment does not reset to a default frequency (e.g. F_LO as shown in FIG. 5) after completely processing the received frame, instead, the compensated frequency output from the PLL is used for processing at least a portion of a preamble part of a subsequent frame. In this embodiment, the PLL is adaptively reconfigured for each frame without resetting the PLL output frequency to the default frequency before processing each frame. In some other embodiments, the PLL outputs this compensated frequency for processing one or more subsequent frames until a new frequency offset is estimated and fed to reconfigure the PLL.

Figure 6A:
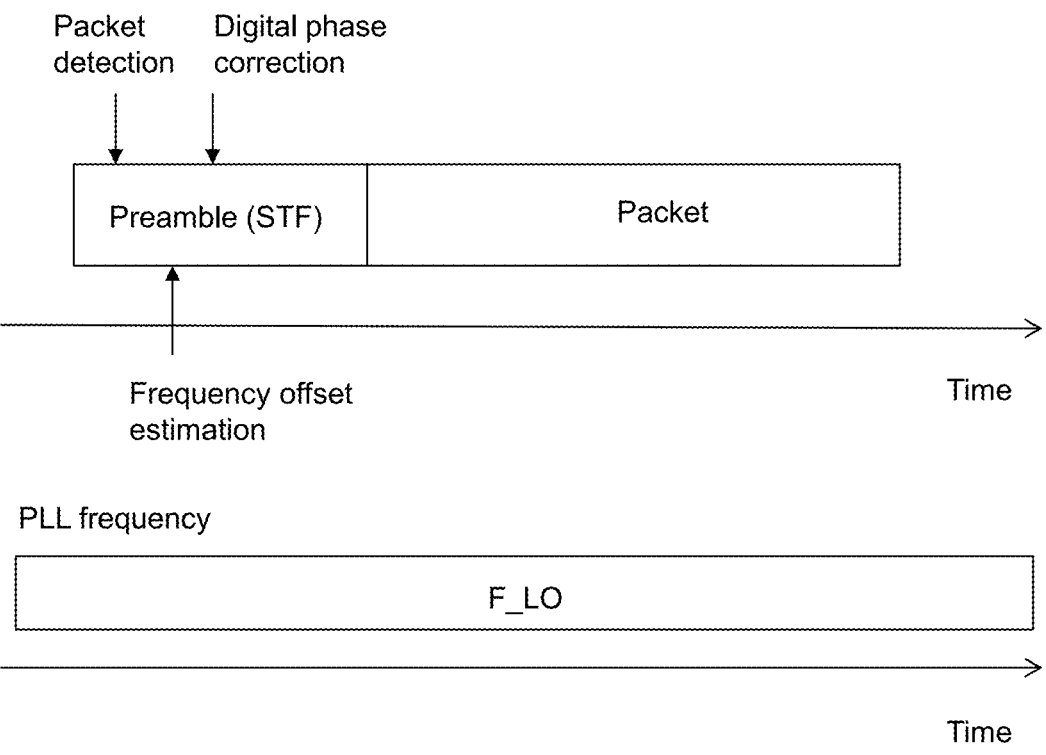
FIG. 6A shows timing diagrams of processing a received frame which compensates a frequency offset by digital phase correction, where a PLL frequency remains unchanged.
Figure 6B:
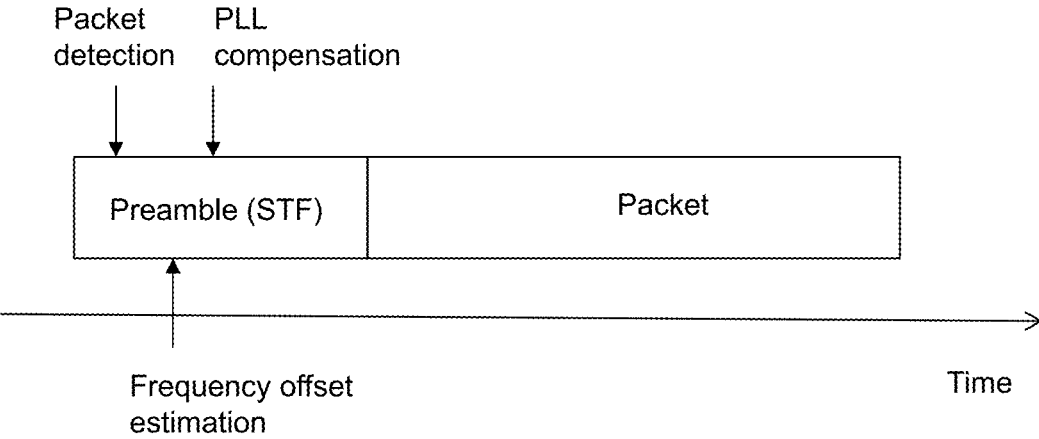
FIG. 6B shows timing diagrams of processing a received frame which compensates a frequency offset by PLL frequency compensation according to an embodiment of the adaptive frequency shift correction method.
Figure 6B:
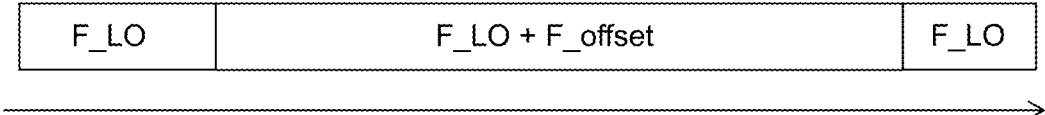

FIG. 6A shows timing diagrams of processing a current frame which compensates a frequency offset by digital phase correction according to a convention frequency shift correction method. A corresponding PLL output frequency for various stages of processing the current frame is also shown in FIG. 6A. The PLL output frequency is set to a default LO frequency (F_LO) and remains unchanged during receiving and processing the entire current frame. An example of the current frame is a Wi-Fi frame complying with one or more of the Wi-Fi standards. FIG. 6B shows timing diagrams demonstrating an embodiment of the adaptive frequency shift correction method, which reduces the impact of a residual DC component in a received signal by handling a frequency offset using PLL frequency compensation. In this embodiment, the adaptive frequency shift correction method is performed on a frame basis, where the frequency offset of each frame is calculated and compensated by changing the PLL output frequency accordingly. FIG. 6B also shows a timeline of a PLL output frequency corresponding to different stages of processing the current frame in the adaptive frequency shift correction system according to an embodiment of the present invention.

As shown in FIG. 6A, the PLL output frequency is locked at the default LO frequency (F_LO) before, during, and after receiving and processing a preamble part and a packet part of the current frame. During the period of receiving and processing the preamble part of the current frame, the receiver performs packet detection, frequency offset estimation, followed by digital phase correction. An example of the preamble part is a Short Training Field (STF) in a Wi-Fi frame. The receiver then processes the digitally phase corrected signal by demodulating the packet part of the current frame. In the example as shown in FIG. 6B, the PLL output frequency is initialized to a default LO frequency (F_LO) before processing a current frame. An embodiment of the adaptive frequency shift correction system receives and processes a preamble part in the current frame and performs packet detection and frequency offset estimation based on the default LO frequency. A frequency offset (F_offset) between the frequency used to carry information in the preamble part of the current frame and the default LO frequency of the PLL is estimated. The adaptive frequency shift correction system then performs PLL compensation according to the estimated frequency offset. For example, the PLL output frequency is set to a compensated frequency equal to the default LO frequency (F_LO) plus the frequency offset (F_offset). As shown in FIG. 6B, the PLL output frequency is changed from the default LO frequency (F_LO) to the compensated frequency (F_LO+F_offset) before processing the packet part of the received frame. The packet part is thus processed according to the PLL compensated frequency which mitigates the impact of the residual DC component of the signal. In this embodiment, the adaptive frequency shift correction system reconfigures the PLL to set the output frequency back to the default LO frequency (F_LO) after processing the entire current frame. In some other embodiments, the compensated frequency output from the PLL can be used to process a subsequent frame without reconfiguring the PLL to the default LO frequency after processing the current frame. The PLL of the adaptive frequency shift correction system was not designed for this purpose but can be effectively used to correct the frequency drifting of the received wireless signal. Embodiments of the PLL track the frequency in a packet-by-packet or frame-by-frame manner to quickly align with the frequency of the received signal before processing the packet part of each frame. For network operating with a relatively low frequency band, for example, in a frequency band under one gigahertz. (i.e. sub GHz), the symbol duration is longer than the one used in high frequency bands. There is enough time for the PLL to relock to the compensated frequency before processing the packet part of the received frame as the duration of the preamble part is relatively long. For example, the PLL lock time is in the order of microseconds, such as 2 microseconds, while the duration for transmitting an STF of an IEEE 802.11ah frame is 160 microseconds for 1 MHz channel bandwidth or 80 microseconds for 2, 4, or 8 MHz channel bandwidth. In some embodiments, one or more registers inside the PLL can be adaptively changed according to the estimated frequency offset to rapidly control the output frequency of the PLL which can even shorten the PLL lock time.

Receivers typically have a limited dynamic signal amplitude range within which signals can be successfully received. High power incoming signals with an amplitude higher than the dynamic signal amplitude range can cause the RF receiving front-end to saturate, result in demodulation failure. Automatic Gain Control (AGC) uses a closed-loop feedback regulating circuit to adjust a front-end gain to ensure that the incoming signal is within the dynamic range of the receiver. The AGC circuit maintains a suitable signal amplitude within the dynamic range at its output, despite variation of the signal amplitude at the input. In the receiving data flow, when the AGC circuit is in operation for receiving high power signals, a signal is processed by the AGC circuit before packet detection. For example, the receiver processes the signal with AGC to control the signal strength before Short Training Field (STF) detection and Long Training Field (LTF) detection of a received frame. As a result of executing AGC before packet detection, PLL frequency compensation may be delayed to just before the start of processing the LTF in the received frame. After PLL frequency compensation is accomplished, there is a settling time for PLL configuration. The settling time depends on the digital filter delay time. During the settling time of PLL configuration, the receiver waits for new samples, after PLL compensation, from the radio domain to reach the digital domain before the receiver continues to process the LTF. The end of the settling time usually falls within the period of processing the STF, however, in some cases, the settling time falls partially within the period of processing the LTF. In an embodiment of the frequency shift correction method, LTF detection is delayed by a predetermined period to avoid packet detection for the LTF during the settling time. In some embodiments, the predetermined period is selected to be long enough to ensure LTF detection always happens after the settling time.

Figure 7A:
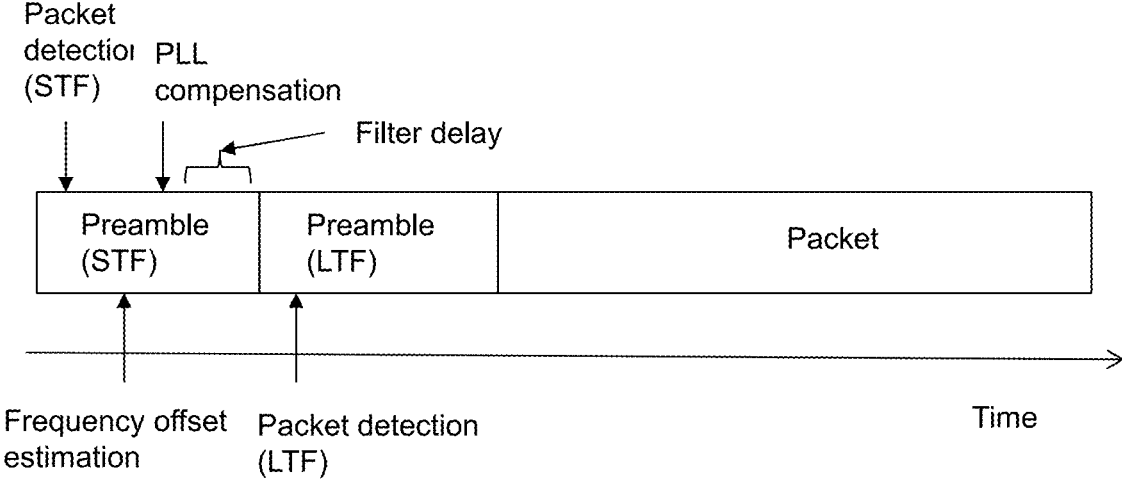
FIG. 7A shows a timing diagram of processing a received frame with PLL frequency compensation when Automatic Gain Control (AGC) is not engaged during packet detection according to an embodiment of the present invention.
Figure 7B:
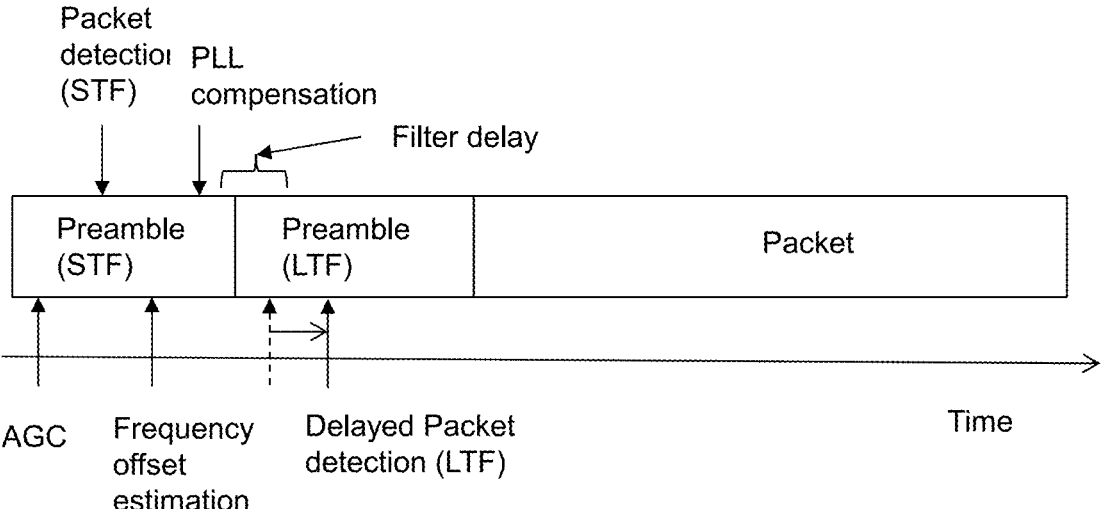
FIG. 7B shows a timing diagram of processing a received frame with PLL frequency compensation when AGC is engaged during packet detection according to an embodiment of the present invention.

FIG. 7A illustrates the operation when AGC is not engaged during packet detection and FIG. 7B illustrates the operation when AGC is engaged during packet detection according to embodiments of the present invention. As shown in the embodiment of FIG. 7A, an RF receiving front-end performs STF packet detection, frequency offset estimation, and PLL compensation by reconfiguring the PLL according to the estimated frequency offset during processing of the STF in a current Wi-Fi frame. As shown in FIG. 7A, after a filter delay time, or a settling time, from PLL compensation, the RF receiving front-end is still processing the STF of the current Wi-Fi frame, and LTF packet detection is performed after the settling time. The RF receiving front-end then processes the LTF and packet parts of the current Wi-Fi frame using the PLL compensated frequency. In the case of engaging AGC during packet detection for high power signals as shown in the embodiment of FIG. 7B, the AGC operation is executed prior to STF packet detection. Frequency offset estimation and corresponding PLL compensation are performed after STF packet detection during processing of the STF of the current Wi-Fi frame. However, after a filter delay time, or the settling time of PLL configuration, the RF receiving front-end already proceeds to process at least a portion of the LTF in the current Wi-Fi frame. In order to prevent performing LTF packet detection before or during the settling time, some embodiments of the frequency shift correction method intentionally delay LTF packet detection for a predetermined period as illustrated in the embodiment of FIG. 7B.

Figure 8:
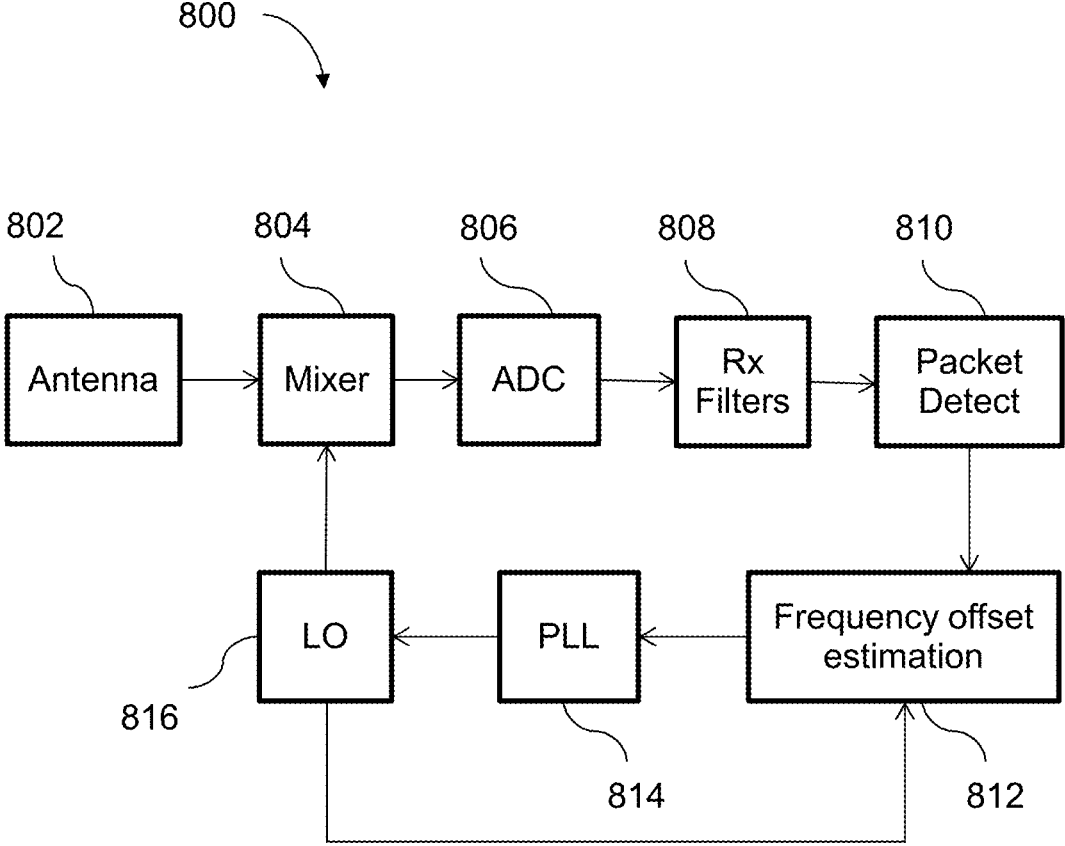
FIG. 8 is a schematic block diagram of an exemplary receiver implementing one or more embodiments of the present invention.

Embodiments of the adaptive frequency shift correction method or system described herein reconfigure a PLL to process at least a portion of a current frame using a compensated frequency derived from the current frame. FIG. 8 illustrates a schematic block diagram of a receiver 800 receiving a wireless signal according to an embodiment of the present invention. The wireless signal is received by an antenna 802 of the receiver 800 and down converted by a mixer 804 according to a frequency output from a local oscillator 816. The output frequency of the local oscillator 816 is controlled by a PLL 814, where the PLL 814 initially is configured to provide a default local oscillator frequency. The down converted signal is then converted from an analog domain to a digital domain by an Analog-to-Digital Converter (ADC) 806. The output of the ADC 806 is filtered by Receiver filters (Rx Filters) 808, for example, a HPF is used to mitigate the residual DC component in the received wireless signal. A packet detect module 810 is coupled to the Rx Filters 808 to receive filtered signal and detect at least a portion of a preamble part of a current frame carried in the received wireless signal. For example, the packet detect module 810 conducts packet detection by correlating samples of the filtered signal with one or more correlators or kernels, and detects at least the portion of the preamble part depending on power levels of correlation outputs. At least a portion of the preamble is successfully detected when the power levels of the correlation output satisfy one or more predetermined criteria. An example of the preamble part or the portion of the preamble part is an STF in a Wi-Fi frame. After successful packet detection conducted by the packet detect module 810, a frequency offset estimation module 812 estimates a frequency offset between a frequency detected from the preamble part of the current frame and the default local oscillator frequency. This frequency offset estimated by the frequency offset estimation module 812 is fed back to the PLL 814 to reconfigure the PLL 814 to provide a compensated frequency according to the frequency offset. The compensated frequency is then used to process at least a packet part of the current frame, for example, the mixer 804 down converts the wireless signal carrying the packet part of the current frame using the compensated frequency. The frequency output from the PLL 814 may be reset to the default local oscillator frequency after completely processing the current frame according to some embodiments of the present invention.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims. Well-known circuits, processes, algorithms, structures, and techniques may be shown without unnecessary detail to avoid obscuring the aspects.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks may be stored in a computer-readable or machine-readable medium. The computer-readable medium may comprise memory or data storage media, such as Random-Access Memory (RAM) such as Synchronous Dynamic Random-Access Memory (SDRAM), Read-Only Memory (ROM), Non-Volatile Random-Access Memory (NVRAM), Electrically Erasable Programmable Read-Only Memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves. The program code may be executed by a processor, which may include one or more processors, such as one or more Digital Signal Processors (DSPs), general purpose microprocessors, an Application Specific Integrated Circuits (ASICs), Field Programmable Logic Arrays (FPGAs), or other equivalent integrated or discrete logic circuitry. Such a processor may be configured to perform any of the steps described in this disclosure. A general-purpose processor may be a microprocessor; alternatively, the processor may be any conventional processor, controller, microcontroller, or state machine. A processor may also be implemented as a combination of computing devices.

To clearly illustrate the interchangeability of hardware and software, various illustrative components, blocks, modules, engines, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present application.

What is claimed is:

1. A method of processing wireless signals with adaptive frequency shift correction, the method comprising the steps of:

receiving a wireless signal by a receiver;

performing packet detection to detect at least a portion of a preamble part of a current frame carried in the wireless signal according to a default frequency output from a Phase Lock Loop (PLL), wherein the portion of the preamble part comprises a periodic structure for packet detection and frequency acquisition;

estimating a frequency offset between the default frequency and a frequency used to carry information in the preamble part of the current frame;

reconfiguring the PLL according to the frequency offset to output a compensated frequency; and processing at least a packet part of the current frame using the compensated frequency output from the PLL.

2. The method of claim 1, wherein the step of performing packet detection to detect at least a portion of a preamble part comprises down converting the wireless signal according to the default frequency output from the PLL, correlating samples of the wireless signal with one or more correlators, and detecting the portion of the preamble part depending on power levels of correlation outputs.

3. The method of claim 1, wherein the step of processing at least a packet part comprises demodulating the packet part based on the compensated frequency output from the PLL after packet detection.

4. The method of claim 1, further comprising resetting the PLL to the default frequency after completely processing the current frame.

5. The method of claim 4, further comprising receiving and performing packet detection to detect at least a portion of a preamble part of a subsequent frame according to the default frequency and reconfiguring the PLL to output a new compensated frequency for processing at least a packet part of the subsequent frame.

6. The method of claim 1, wherein the step of estimating a frequency offset further comprises detecting a phase drift of the current frame in radians and converting the phase drift in radians to the frequency offset in Hertz.

7. The method of claim 1, wherein the PLL is reconfigured to output the compensated frequency by increasing or decreasing the default frequency according to the frequency offset.

8. The method of claim 1, wherein the PLL is reconfigured to output the compensated frequency during processing the preamble part of the current frame before processing the packet part of the current frame.

9. The method of claim 1, further comprising applying a High Pass Filter (HPF) to filter the wireless signal carrying the current frame to remove a residual Direct Current (DC) component of the wireless signal after reconfiguring the PLL to output the compensated frequency.

10. The method of claim 1, wherein the current frame is a Wi-Fi frame, and the portion of the preamble part comprises a Short Training Field (STF).

11. The method of claim 10, wherein the preamble part further comprises a Long Training Field (LTF), and the method further comprises:

performing Automatic Gain Control (AGC) before performing packet detection to detect the STF and LTF of the current frame, wherein packet detection to detect the STF is performed according to the default frequency output from the PLL;

determining a settling time of reconfiguring the PLL according to the frequency offset, wherein the settling time is a time required for new sample to reach a digital domain from a radio domain, after PLL compensation; and performing packet detection to detect the LTF according to the compensated frequency output from the PLL after the settling time, wherein the LTF packet detection is delayed by a predetermined period to prevent performing the LTF packet detection before the settling time.

12. The method of claim 11, wherein the settling time depends on a filter delay time.

13. A wireless communication device for processing wireless signals with adaptive frequency shift correction, comprising:

a receiver, comprising a Phase Lock Loop (PLL);

a processor, communicatively coupled with the receiver; and one or more memory banks, communicatively coupled to the processor and storing processor readable codes that, when executed by the processor in conjunction with a modem, is configured for:

receiving a wireless signal by the receiver;

performing packet detection to detect at least a portion of a preamble part of a current frame carried in the wireless signal according to a default frequency output from the PLL, wherein the portion of the preamble part comprises a periodic structure for packet detection and frequency acquisition;

estimating a frequency offset between the default frequency and a frequency used to carry information in the preamble part of the current frame;

reconfiguring the PLL according to the frequency offset to output a compensated frequency; and processing at least a packet part of the current frame using the compensated frequency output from the PLL.

14. The wireless communication device of claim 13, wherein the wireless communication device is configured to reset the PLL to output the default frequency after completely processing the current frame.

15. The wireless communication device of claim 14, wherein the wireless communication device is configured to receive and perform packet detection to detect at least a portion of a preamble part of a subsequent frame according to the default frequency, and the PLL is reconfigured to output a new compensated frequency for processing a packet part of the subsequent frame.

16. The wireless communication device of claim 13, wherein the wireless communication device is configured to detect a phase drift of the current frame in radians and convert the phase drift in radians to the frequency offset in Hertz.

17. The wireless communication device of claim 13, wherein the PLL is reconfigured to output the compensated frequency by increasing or decreasing the default frequency according to the frequency offset.

18. The wireless communication device of claim 13, wherein the receiver further comprises a High Pass Filter (HPF) for filtering the wireless signal carrying the current frame to remove a residual Direct Current (DC) component of the wireless signal after the PLL is reconfigured to output the compensated frequency.

19. The wireless communication device of claim 13, wherein the portion of the preamble part comprises a Short Training Field (STF), and the preamble part further comprises a Long Training Field (LTF).

20. The wireless communication device of claim 19, wherein the wireless communication device is configured for:

performing Automatic Gain Control (AGC) before performing packet detection to detect the STF and LTF of the current frame, wherein packet detection for detecting the STF is performed according to the default frequency output from the PLL;

determining a settling time of reconfiguring the PLL according to the frequency offset, wherein the settling time is a time required for new sample to reach a digital domain from a radio domain, after PLL compensation; and performing packet detection to detect the LTF according to the compensated frequency output from the PLL after the settling time, wherein the LTF packet detection is delayed by a predetermined period to prevent performing the LTF packet detection before the settling time.

\* \* \* \* \*